United States Patent
Hayashi et al.

(10) Patent No.: US 8,851,857 B2
(45) Date of Patent: Oct. 7, 2014

(54) WIND TURBINE BLADE AND WIND POWER GENERATOR USING THE SAME

(75) Inventors: Kentaro Hayashi, Nagasaki (JP);
Hiroshi Nishino, Nagasaki (JP);
Hiroyuki Hosoya, Nagasaki (JP);
Atsushi Matsuo, Nagasaki (JP); Kai Karikomi, Nagasaki (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 478 days.

(21) Appl. No.: 12/674,849

(22) PCT Filed: Nov. 19, 2007

(86) PCT No.: PCT/JP2007/072352
§ 371 (c)(1),
(2), (4) Date: Mar. 19, 2010

(87) PCT Pub. No.: WO2009/066360
PCT Pub. Date: May 28, 2009

(65) Prior Publication Data
US 2010/0213721 A1    Aug. 26, 2010

(51) Int. Cl.
*F03D 7/04* (2006.01)
*F03D 7/02* (2006.01)
*F03D 1/06* (2006.01)

(52) U.S. Cl.
CPC .............. *F03D 1/0641* (2013.01); *Y02E 10/725* (2013.01); *F05B 2240/301* (2013.01); *Y02E 10/721* (2013.01)
USPC .......................................... 416/240; 416/228

(58) Field of Classification Search
USPC ................... 416/132 B, 223 R, 228, 238, 240
See application file for complete search history.

(56) References Cited

U.S. PATENT DOCUMENTS

| 1,802,094 A | | 4/1931 | Stuart |
| 4,291,235 A | * | 9/1981 | Bergey et al. ................... 290/55 |
| 4,334,824 A | * | 6/1982 | Tsuchikawa et al. ..... 416/132 R |

(Continued)

FOREIGN PATENT DOCUMENTS

| CN | 1732340 A | 2/2006 |
| JP | S61-190173 | 8/1986 |

(Continued)

OTHER PUBLICATIONS

Japan Patent Office, "Decision to Grant a Patent for JP 2009-542419", Oct. 16, 2012.

(Continued)

*Primary Examiner* — Ned Landrum
*Assistant Examiner* — Joshua R Beebe
(74) *Attorney, Agent, or Firm* — Manabu Kanesaka; Benjamin J. Hauptman; Kenneth M. Berner

(57) ABSTRACT

Provided are a wind turbine blade that can reduce the thickness of a turbulent-flow boundary layer generated on the blade surface of a blade tip portion to prevent noise generated at a trailing edge portion effectively, as well as a wind power generator using the same. Provided is a wind turbine blade, which is a wind turbine blade having an airfoil shape in cross section, wherein an angle-of-attack decreasing portion that decreases an angle of attack during rotation at at least a predetermined rotational speed is provided over a predetermined range from a blade tip to a blade root side.

4 Claims, 3 Drawing Sheets

(56) References Cited

U.S. PATENT DOCUMENTS

| | | | |
|---|---|---|---|
| 5,181,678 A * | 1/1993 | Widnall et al. | 244/219 |
| 5,474,425 A * | 12/1995 | Lawlor | 416/223 R |
| 6,582,196 B1 | 6/2003 | Andersen et al. | |
| 6,899,523 B2 | 5/2005 | Wobben | |
| 2006/0216153 A1* | 9/2006 | Wobben | 416/241 A |
| 2008/0093860 A1* | 4/2008 | Suzuki | 290/55 |

FOREIGN PATENT DOCUMENTS

| | | |
|---|---|---|
| JP | 2002-276535 | 9/2002 |
| JP | 2003-524100 A | 8/2003 |
| JP | 2005-291185 | 10/2005 |
| JP | 2006-152864 | 6/2006 |
| JP | 2006-242194 | 9/2006 |
| JP | 2006-521486 | 9/2006 |
| NL | 1030111 C1 | 12/2005 |
| WO | WO 92/01156 A1 | 1/1992 |
| WO | WO 2004/061298 A2 | 7/2004 |

OTHER PUBLICATIONS

European Patent Office, "Supplementary European Search Report for EP 07 83 2082", Dec. 5, 2012.

The State Intellectual Property Office of the People's Replublic of China, "Office Action for CN 200780100312.8", Feb. 25, 2013.

IP Australia, "Notice of Acceptance for AU 2007361564", Feb. 4, 2013.

* cited by examiner

WIND TURBINE BLADE AND WIND POWER GENERATOR USING THE SAME

RELATED APPLICATIONS

The present application is National Phase of International Application No. PCT/JP2007/072352 filed Nov. 19, 2007, the disclosure of which is hereby incorporated by reference herein in its entirety.

TECHNICAL FIELD

The present invention relates to a wind turbine blade and a wind power generator that generates power using the same.

BACKGROUND ART

Wind power generators have problems of noise generated from blades. The main causes of blade-generated noise are a blade tip vortex and a turbulent-flow boundary layer generated on the blade surface.

It is thought that decreasing the rotational speed of a rotor is effective in reducing the noise level. Specifically, decreasing the rotational speed of the rotor decreases the inlet velocity of air to the blades, thereby allowing aerodynamic sound to be reduced. However, decreasing the rotational speed of the rotor has a problem of decreasing the power generation efficiency.

In particular, for reducing noise at a high-noise blade tip portion, for example, an approach disclosed in Patent Citation 1 has been proposed.

This prevents noise by curving or bending the blade tip portion on the blade surface toward the trailing edge of the blade (a so-called sweptback wing) and/or providing a small blade (a so-called winglet) that is bent toward a positive pressure surface so as to intersect the blade tip portion to thereby decrease the vortex at the blade tip portion.

Patent Citation 1: Japanese Translation of PCT International Application, Publication No. 2006-521483

In recent years, wind power generators have been required to generate high power and have increased in size. Along with this, the rotor diameter, that is, the blade lengths of wind turbine blades, have been increased.

With the increase in blade length, the moving speed of blade tip portions increases. This increases noise generated, and therefore, a further noise reduction is required.

Moreover, because the influence of noise due to turbulent-flow boundary layers generated on blade surfaces in the vicinity of the blade tips is increased due to the increase in blade length, sufficient noise reduction cannot be expected with an approach that reduces noise only at the blade tip portions, as in Patent Citation 1.

The present invention is made in consideration of the circumstances described above, and it is an object thereof to provide a wind turbine blade that can reduce the thickness of the turbulent-flow boundary layer generated on the blade surface at the blade tip portion to prevent noise generated at the trailing edge portion effectively, as well as a wind power generator using the same.

The present invention adopts the following solutions to solve the problems described above.

According to a first aspect of the present invention, there is provided a wind turbine blade having an airfoil shape in cross section, wherein an angle-of-attack decreasing portion that decreases an angle of attack during rotation at at least a predetermined rotational speed is provided over a predetermined range from a blade tip to a blade root side.

With the wind turbine blade according to this aspect, since the angle-of-attack decreasing portion decreases the angle of attack during rotation at at least the predetermined rotational speed over a predetermined range from the blade tip to the blade root side, the thickness of the boundary layer on the blade surface of the predetermined range from the blade tip to the blade root side can be decreased during operation.

The decrease in thickness of the boundary layer can prevent the occurrence of a vortex at the trailing edge of the blade, thus reducing noise.

Since the angle-of-attack decreasing portion is provided at the tip portion of the wind turbine blade at which high noise is generated, noise can be reduced effectively. This eliminates the need for decreasing the rotational speed to reduce the noise, which can prevent a degradation in performance, such as a degradation in power generation efficiency.

Given the same cross-sectional shape of the blade, the lift generated is decreased with a decrease in angle of attack; therefore, it is preferable to set the range in which the angle-of-attack decreasing portion is provided in consideration of the influence on the performance of the blade and the noise reduction effect. This range is set, for example, within 20% of the blade length, preferably, within 10%.

The predetermined rotational speed is set to, for example, a rotational speed at which the wind power generator outputs rated power, that is, a rated rotational speed.

In the above aspect, the angle-of-attack decreasing portion may be formed so that the angle of attack gradually decreases from the angle of attack of the blade root side toward the blade tip.

In other words, the angle-of-attack decreasing portion is formed such that it is twisted so that the angle of the blade with respect to the wind inflow direction decreases gradually toward the blade tip, that is, a twist angle is applied to the blade tip portion.

This makes the angle of attack of the angle-of-attack decreasing portion always differ from the blade root side irrespective of the rotational speed, which can reduce noise in a wide rotational speed range.

In the above aspect, the angle-of-attack decreasing portion may be formed so as to become substantially an extension of the blade surface of the blade root side during rotation at the predetermined rotational speed.

In other words, the surface of the angle-of-attack decreasing portion is formed to become substantially flush with the blade surface of the blade root side during rotation at the predetermined rotational speed.

When a blade rotates, the blade is deformed due to wind. This deformation becomes large at the tip portion of the blade. This deformation makes the angle of attack at the tip portion of the wind turbine blade larger than a design value, thus increasing noise.

With this configuration, when the blade rotates at the predetermined rotational speed and is deformed due to wind, the angle-of-attack decreasing portion is formed so as to become substantially an extension of the blade surface of the blade root side, that is, such that the blade surface of the blade root side becomes flush with the blade surface of the angle-of-attack decreasing portion, which therefore prevents the angle of attack of the angle-of-attack decreasing portion from becoming larger than the design value; in other words, it can decrease the angle of attack at the predetermined rotational speed as compared with a blade having no angle-of-attack decreasing portion.

This can reduce noise at the predetermined rotational speed and can prevent a degradation in performance With the above configuration, it is preferable that the angle-of-attack decreasing portion be smoothly curved so that the curve gradually becomes sharp from the blade surface of the blade root side toward a positive pressure surface side.

According to a second aspect of the present invention, there is provided a wind power generator that generates electricity using a wind turbine blade in which the occurrence of a vortex at the trailing edge of the blade during rotation at at least a predetermined rotational speed can be prevented.

This allows the wind power generator to reduce the occurrence of noise during operation. Since this can relax restrictions due to noise, the flexibility of the installation site can be ensured; for example, it can be installed in the vicinity of a residential district.

According to the present invention, since the angle-of-attack decreasing portion decreases the angle of attack during rotation at at least the predetermined rotational speed over the predetermined range from the blade tip to the blade root side, the occurrence of a vortex at the trailing edge of the blade can be prevented during operation, thus reducing noise.

Moreover, since the angle-of-attack decreasing portion is provided at the tip portion of the wind turbine blade at which high noise is generated, noise can be reduced effectively. This eliminates the need for decreasing the rotational speed to reduce the noise, which can prevent a degradation in performance, such as a degradation in power generation efficiency.

EXPLANATION OF REFERENCE

Figure 1:
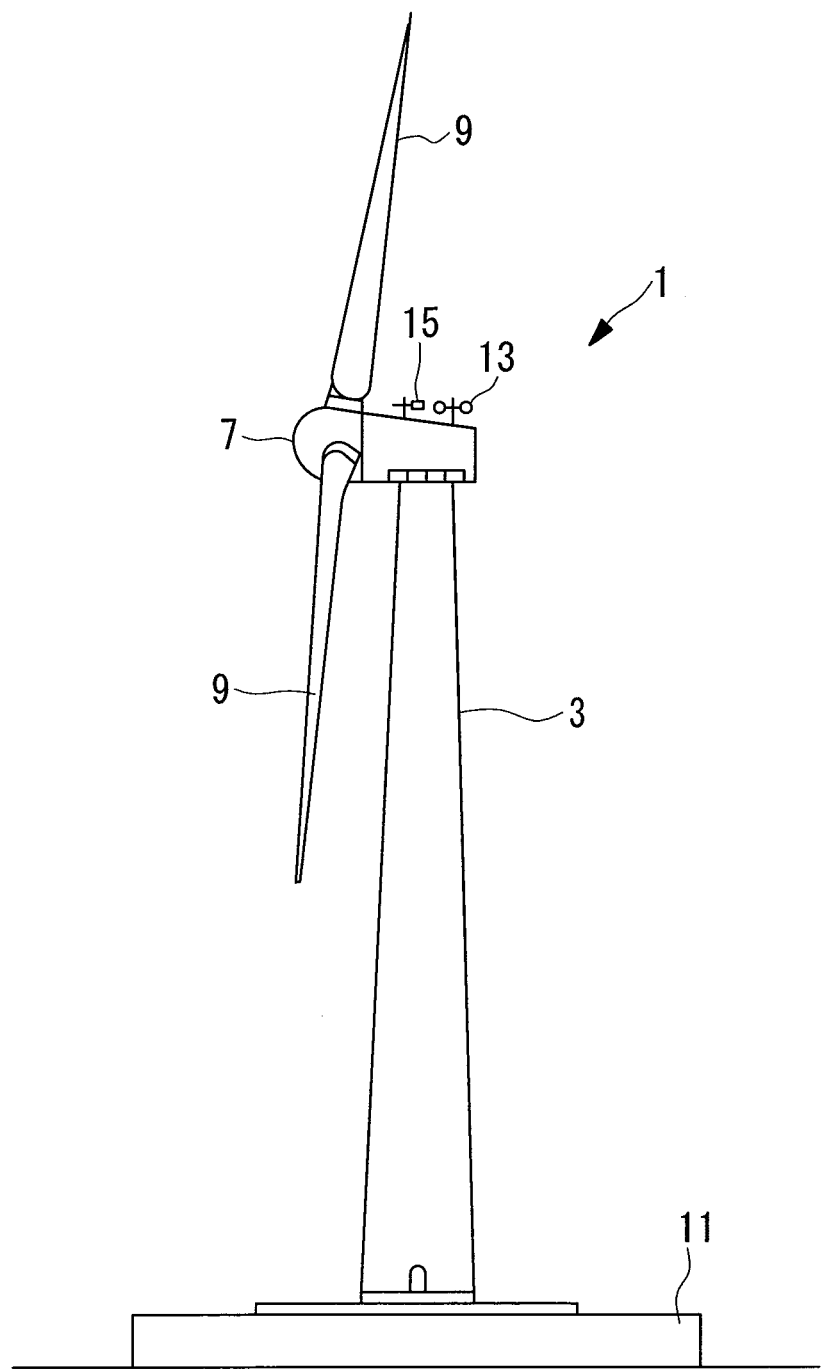
FIG. 1 is a side view showing, in outline, the overall configuration of a wind power generator according to a first embodiment of the present invention.

1: wind power generator
9: wind turbine blade
19: angle-of-attack decreasing portion
20: blade tip
21: blade root
27: positive pressure surface

BEST MODE FOR CARRYING OUT THE INVENTION

First Embodiment

A wind power generator 1 according to an embodiment of the present invention will be described hereinbelow based on the drawings.

FIG. 1 is a side view showing, in outline, the overall configuration of the wind power generator 1.

The wind power generator 1 includes, as shown in FIG. 1, a tower 3 that is vertically erected on a foundation 11; a nacelle 5 that is substantially horizontally mounted on the upper end of the tower 3 so as to be rotatable, with the tower 3 serving as the fulcrum; a rotor head 7 mounted on the nacelle 5 so as to be rotatable about the substantially horizontal axis thereof; and a plurality of wind turbine blades 9 that are mounted in a radiating pattern about the rotational axis of the rotor head 7 so as to be rotatable about the blade longitudinal direction.

The force of wind blowing against the wind turbine blades 9 from the rotational axis direction of the rotor head 7 is converted to motive power that rotates the rotor head 7 about the rotational axis.

An anemometer 13 that measures the wind speed value in the vicinity, a anemoscope 15 that measures the wind direction, and a lightning rod (not shown) are provided at appropriate locations of the outer peripheral surface (for example, at the top etc.) of the nacelle 5.

The nacelle 5 accommodates a generator connected to the rotor head 7 via a gearbox coaxial therewith, both of which are not shown. That is, generator output power can be obtained from the generator by driving the generator while increasing the rotational speed of the rotor head 7 with the gearbox.

Figure 2:
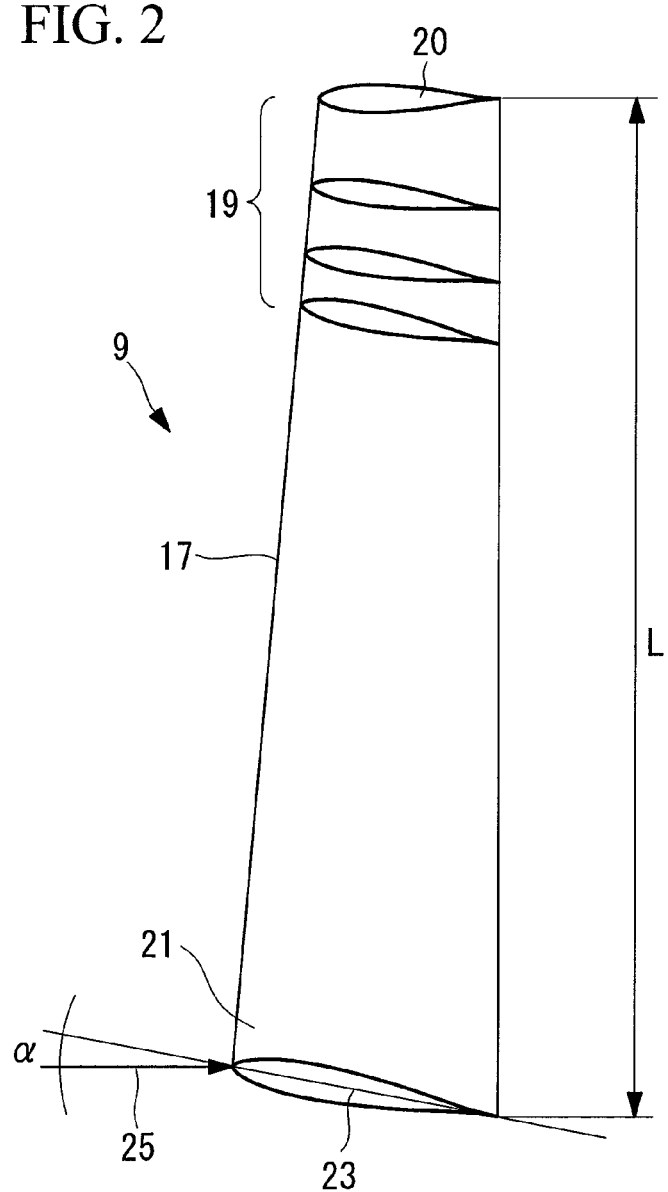
FIG. 2 is a front view of the wind turbine blade according to the first embodiment of the present invention.

FIG. 2 is a front view of the wind turbine blade 9. FIG. 2 also shows cross-sectional views at certain locations of the wind turbine blade 9.

The wind turbine blade 9 is a hollow body whose cross-sectional shape is an airfoil shape. The airfoil shape of the wind turbine blade 9 is defined by a skin 17 formed of, for example, fiberglass reinforced plastic. The strength of the skin 17 is reinforced from the inside with a main girder etc.

The wind turbine blade 9 has an angle-of-attack decreasing portion 19 at a blade tip 20 portion. The angle-of-attack decreasing portion 19 is configured such that an angle of attack, which is the angle that the chord 23 forms relative to a wind direction 25, decreases gradually from the angle of attack a at a blade root 21 side toward the blade tip 20. In other words, the angle-of-attack decreasing portion 19 is formed such that it is twisted so that the angle of the blade with respect to the wind inflow direction decreases gradually toward the blade tip 20; that is, a twist angle is applied to the blade tip portion.

Figure 3:
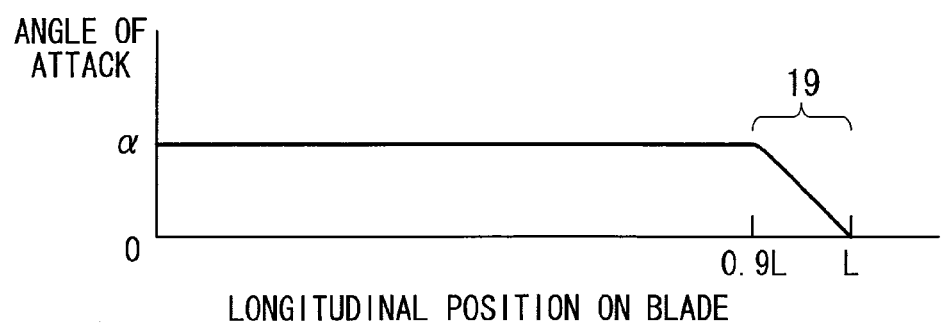
FIG. 3 is a graph showing changes in angle of attack of the wind turbine blade according to the first embodiment of the present invention.

FIG. 3 shows changes in angle of attack in the blade longitudinal direction of the wind turbine blade 9.

The length of the angle-of-attack decreasing portion 19 in the blade longitudinal direction is set in consideration of the influence on the performance of the blade and the noise reduction effect, which is here set at approximately 10% of the blade length L. It is preferable to set it within 20% in consideration of degradation in performance.

The angle of attack at the blade tip 20 of the angle-of-attack decreasing portion 19 is set to, for example, 0° at a rotational speed (rated rotational speed) at which rated output power is generated.

In addition, the angle of attack at the blade tip 20 is not limited to 0°; it may be set to a value other than 0° in consideration of other conditions other than noise.

A value at which the boundary layer becomes the thinnest may be other than 0° depending on the airfoil (for example, with a camber etc.).

The operational action of the thus-configured wind power generator 1 will be described.

The wind power generator 1 measures the wind direction with the anemoscope 15 during operation. Depending on the measurement result, the nacelle 5 rotates so that wind blows from the rotational axis direction of the rotor head 7. That is, wind blows against the wind turbine blade 9 in a fixed direction.

When wind blows against the wind turbine blade 9, lift is generated in a direction intersecting the blade surface. Since this lift moves the wind turbine blade 9, the rotor head 7 rotates about the rotational axis.

The rotational speed of the rotor head 7 is increased by the gearbox to drive the generator, thereby achieving power generation.

The pitch angle of the wind turbine blade 9 is adjusted by rotating in the blade longitudinal direction depending on the wind speed measured by the anemometer 13. If the wind speed is low, the pitch angle is increased so as to increase an area that receives wind. When the wind speed exceeds a rotational speed at which rated output power can be obtained (rated rotational speed), the pitch angle is decreased to reduce the area that receives wind.

At that time, for example, at the rated rotational speed, assuming that the moving speeds are equal, the resistance that wind receives from the blade surface of the angle-of-attack decreasing portion 19 is smaller than that of one having the same angle of attack as the blade root 21 side, because the angle of attack at the angle-of-attack decreasing portion 19 is smaller than that at the blade root 21 side. Since this allows the wind to flow smoothly along the blade surface, the thickness of a boundary layer formed on the blade surface is smaller than one whose blade tip portion has the same angle of attack as the blade root 21 side.

The decrease in thickness of the boundary layer can prevent the occurrence of a vortex at the trailing edge of the wind turbine blade 9, thus reducing noise.

Since the angle-of-attack decreasing portion 19 is provided at the tip portion of the wind turbine blade 9 at which high noise is generated due to the high moving speed, noise can be reduced effectively. This eliminates the need for decreasing the rotational speed to reduce the noise, which can prevent a degradation in performance, such as a degradation in power generation efficiency.

The angle of attack at the angle-of-attack decreasing portion 19 is fixed. Therefore, even if the rotational speed changes, the mutual relationship is not changed.

Therefore, the angle of attack of the angle-of-attack decreasing portion 19 always differs from the blade root 21 side irrespective of the rotational speed, which can reduce noise in a wide range of rotational speeds.

In this manner, the wind power generator 1 can reduce the occurrence of noise during operation. Since this can relax restrictions due to noise, the flexibility of the installation site can be ensured; for example, it can be installed in the vicinity of a residential district.

Second Embodiment

Next, a second embodiment of the present invention will be described using FIG. 4 to FIG. 6.

This embodiment is the same as the first embodiment in basic configuration and differs only in the configuration of the wind turbine blade 9. Thus, in this embodiment, the differences will be described, and duplicated descriptions of the other parts will be omitted.

The same components as in the first embodiment are given the same reference numerals, and their detailed descriptions will be omitted.

Figure 4:
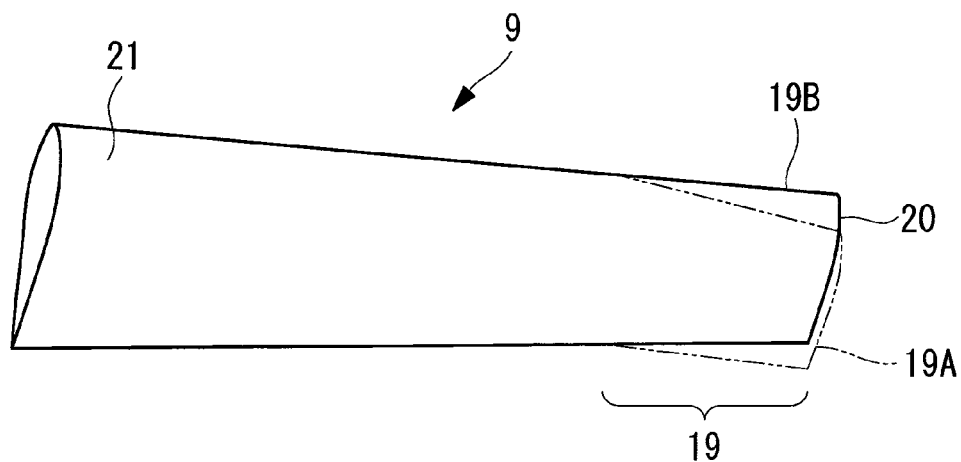
FIG. 4 is a front view of a wind turbine blade according to a second embodiment of the present invention.

FIG. 4 is a front view of the wind turbine blade 9. FIG. 5 is a side view of the wind turbine blade 9, showing a state at the rated rotational speed. FIG. 6 is a side view of the wind turbine blade 9, showing a halted state.

The wind turbine blade 9 is provided with the angle-of-attack decreasing portion 19 at the tip portion thereof. The angle-of-attack decreasing portion 19 is formed, as shown in FIG. 6, by being smoothly curved to a positive pressure surface 27 side so that the curve gradually increases from the blade surface of the blade root 21 side toward the blade tip 20.

Figure 5:
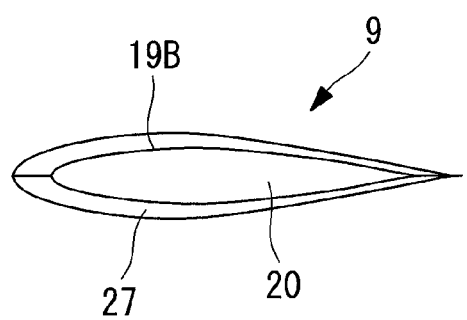
FIG. 5 is a side view of the wind turbine blade according to the second embodiment of the present invention, showing a state at the rated rotational speed.

This curve is set so that, when the wind turbine blade 9 rotates at a predetermined rotational speed and is deformed due to wind, the angle-of-attack decreasing portion 19 becomes substantially an extension of the blade surface of the blade root 21 side; that is, the blade surface of the blade root 21 side becomes flush with the blade surface of the angle-of-attack decreasing portion 19, as shown in FIG. 5. The angle-of-attack decreasing portion 19 at that time is sometimes denoted by reference numeral 19B. The angle-of-attack decreasing portion 19 in the halted state (that is, at production time) is sometimes denoted by reference numeral 19A.

Since the operational action of the thus-configured wind power generator 1 is substantially the same as the first embodiment, duplicated descriptions will be omitted, and differences will be described.

When the wind turbine blade 9 rotates, the wind turbine blade 9 is deformed by a force due to the action of wind (lift and drag). This deformation increases at the blade tip portion of the wind turbine blade 9, that is, at the angle-of-attack decreasing portion 19.

Figure 6:
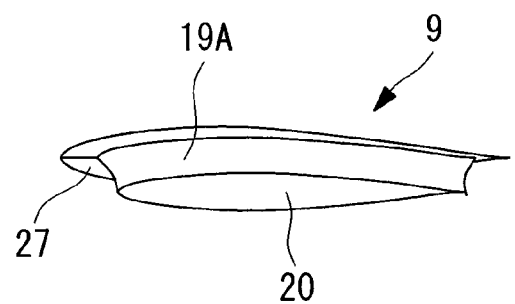
FIG. 6 is a side view of the wind turbine blade according to the second embodiment of the present invention, showing a halted state.

When the rotational speed of the wind turbine blade 9 reaches the rated rotational speed, the angle-of-attack decreasing portion 19 changes from the angle-of-attack decreasing portion 19A in the halted state, shown in FIG. 6, to the state of the angle-of-attack decreasing portion 19B shown in FIG. 5. That is, since the angle-of-attack decreasing portion 19B becomes substantially the extension of the blade surface at the blade root 21 side, the angle of attack of the angle-of-attack decreasing portion 19B does not become larger than a design value.

That is, with a wind turbine blade 9 that does not have the angle-of-attack decreasing portion 19, the angle of attack becomes larger than the design value at the tip portion due to the deformation, thus increasing noise; however, with the wind turbine blade 9 of this embodiment, the angle of attack at the rated rotational speed can be decreased as compared therewith.

Accordingly, this embodiment can reduce noise at the rated rotational speed and can prevent a degradation in performance as compared with the wind turbine blade 9 that does not have the angle-of-attack decreasing portion 19.

Although this embodiment is configured such that the angle-of-attack decreasing portion 19 becomes substantially an extension of the blade surface at the blade root 21 side when the rated rotational speed is reached, the present invention is not limited thereto; for example, the angle-of-attack decreasing portion 19 may be formed such that it is twisted so that the angle of attack becomes smaller than the angle of attack at the blade root 21 side.

The present invention is not limited to the embodiments described above; various modifications can be made as appropriate without departing from the spirit thereof.

For example, the present invention may have a configuration having both the configuration of the first embodiment in which the angle of attack is gradually decreased with an increasing distance to the blade tip 20 of the wind turbine blade 9 and the configuration of the second embodiment that makes use of deformation during rotation.

The invention claimed is:

1. A wind turbine blade, comprising:

a blade having an airfoil shape in cross section and an angle-of-attack decreasing portion, wherein the angle-of-attack decreasing portion that decreases an angle of attack during rotation at at least a predetermined rotational speed is provided over a predetermined range from a blade tip to a blade root side, wherein the predetermined range is within 20% of a length of the blade, wherein a pitch angle of the wind turbine blade is adjusted by being rotated around a blade longitudinal direction, wherein the angle-of-attack decreasing portion is formed by twisting the predetermined range with a twist angle, wherein the angle-of-attack decreasing portion is smoothly curved so that a curve of the angle-of-attack decreasing portion gradually becomes sharper from a blade surface of the blade root side toward a positive pressure surface side, wherein a force due to an action of wind causes deformation of the wind turbine blade, and a surface of the angle-of-attack decreasing portion is formed by the deformation to become substantially flush with the blade surface of the blade root side during rotation at the predetermined rotational speed, and wherein except when the wind turbine blade rotates at the predetermined rotational speed, the surface of the angle-of-attack decreasing portion is not flush with the blade surface of the blade root side.

2. The wind turbine blade according to claim 1, wherein the angle-of-attack decreasing portion is formed so that the angle of attack gradually decreases from the angle of attack of the blade root side toward the blade tip.

3. A wind power generator that generates electricity, comprising: the wind turbine blade according to claim 1.

4. The wind turbine blade according to claim 1, wherein the angle-of-attack decreasing portion forms a first shape viewed from a side of the blade during rotation at the predetermined rotational speed and a second shape viewed from the side of the blade when the blade is halted.

* * * * *